G. A. MANNING.
Belt-Coupling.

No. 165,010. Patented June 29, 1875.

WITNESSES
E. H. Bates
Geo. E. Upham

INVENTOR
George A. Manning
Chipman Hosmer &c.
ATTORNEYS

THE GRAPHIC CO.PHOTO-LITH.39 & 41 PARK PLACE,N.Y.

UNITED STATES PATENT OFFICE.

GEORGE A. MANNING, OF ILION, NEW YORK.

IMPROVEMENT IN BELT-COUPLINGS.

Specification forming part of Letters Patent No. 165,010, dated June 29, 1875; application filed February 13, 1875.

*To all whom it may concern:*

Be it known that I, GEORGE A. MANNING, of Ilion, in the county of Herkimer and State of New York, have invented a new and valuable Improvement in Belt-Couplings; and I do hereby declare that the following is a full, clear, and exact description of the construction and operation of the same, reference being had to the annexed drawings making a part of this specification, and to the letters and figures of reference marked thereon.

Figure 1:
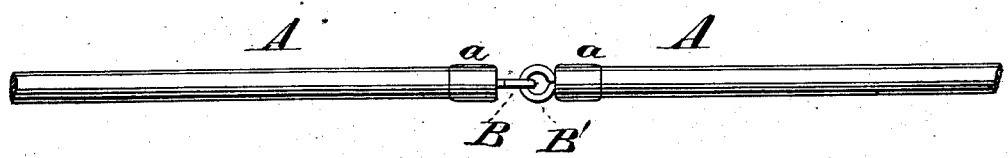
Figure 2:
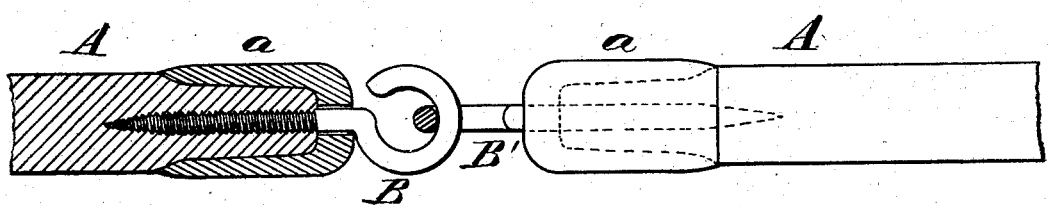
Figure 3:
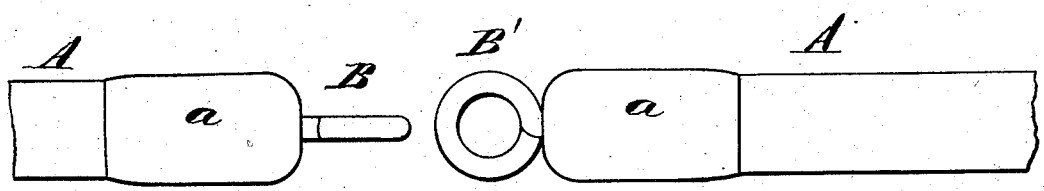

Figure 1 of the drawing is a representation of a side view of my belt-coupling. Fig. 2 is a sectional view of the same, and Fig. 3 is a plan view.

This invention has relation to couplings for belts; and it consists in the combination of the ferrules, adjustable screw hook and eye, and the compressed ends of the belt, as will be hereinafter more fully described.

In the annexed drawings, A A designate the ends of a round belt, which is designed for transmitting motion from one pulley to another. On the ends of this belt ferrules $a$ $a$ of any suitable length are secured. B B designate coupling-hooks having long shanks, which are screw-threaded, and which are inserted into the ends of the belt, as shown in Fig. 2. The ends of the belt are condensed for the purpose of making them hard, and thus giving the screw-shanks firm hold. The ferrules $a$ $a$ keep the leather solid.

I contemplate the application of my adjustable coupling to flat belts as well as to round belts, in which case two or more hooks can be inserted into each end of the belt.

I am aware that a round belt-coupling attachment, in which conical sleeves made in two parts, and having serrations on their interior surfaces to bite the ends of the round belt, have heretofore been employed in connection with outer concentric ferrules, screw-threaded at their ends for the reception of the screw-threaded shanks of interlocking hooks, as shown in Letters Patent granted to James L. Howard, dated April 17, 1860, and I, therefore, disclaim such invention.

What I claim as new, and desire to secure by Letters Patent, is—

In combination with the compressed ends of a belt, the ferrules $a$, the adjustable screw-hook B, and adjustable screw-eye B′, substantially as shown and described.

In testimony that I claim the above I have hereunto subscribed my name in the presence of two witnesses.

GEORGE A. MANNING.

Witnesses:
J. B. PELTON,
CHAS. E. LEWIS.